March 12, 1935. H. W. PLEISTER 1,993,749
BOLT ANCHOR
Filed March 3, 1934 3 Sheets-Sheet 1
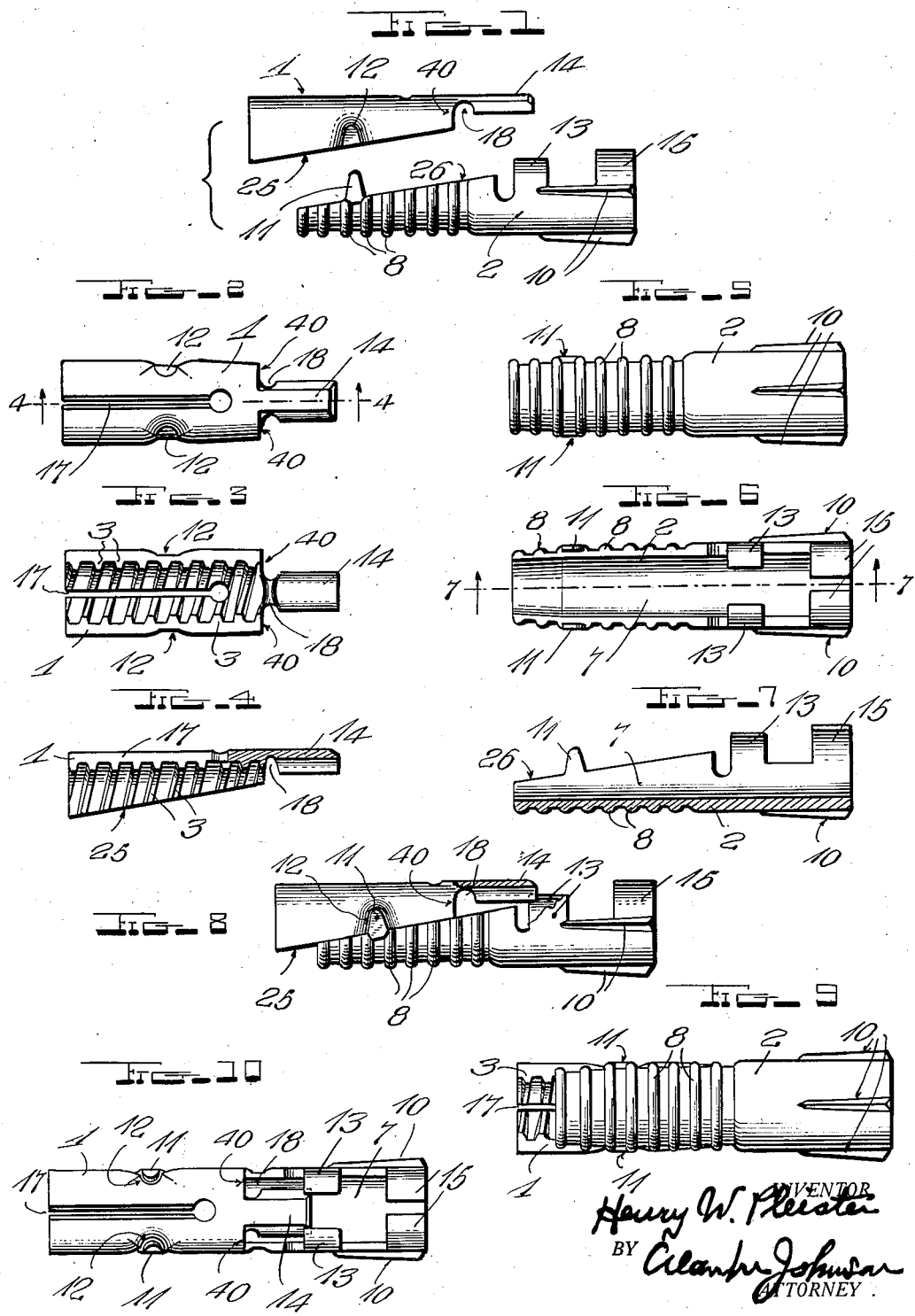

March 12, 1935.  H. W. PLEISTER  1,993,749
BOLT ANCHOR
Filed March 3, 1934  3 Sheets-Sheet 2
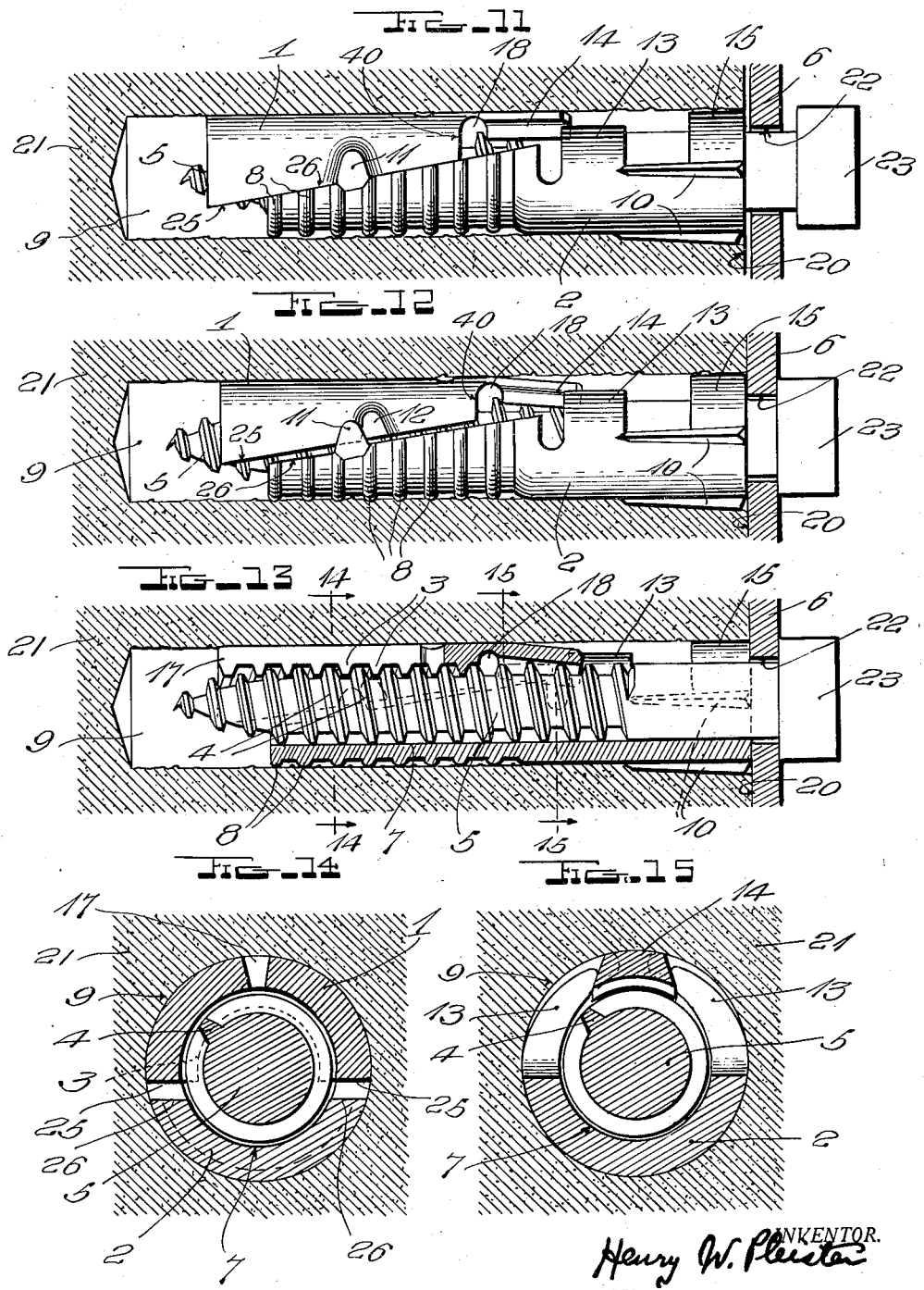

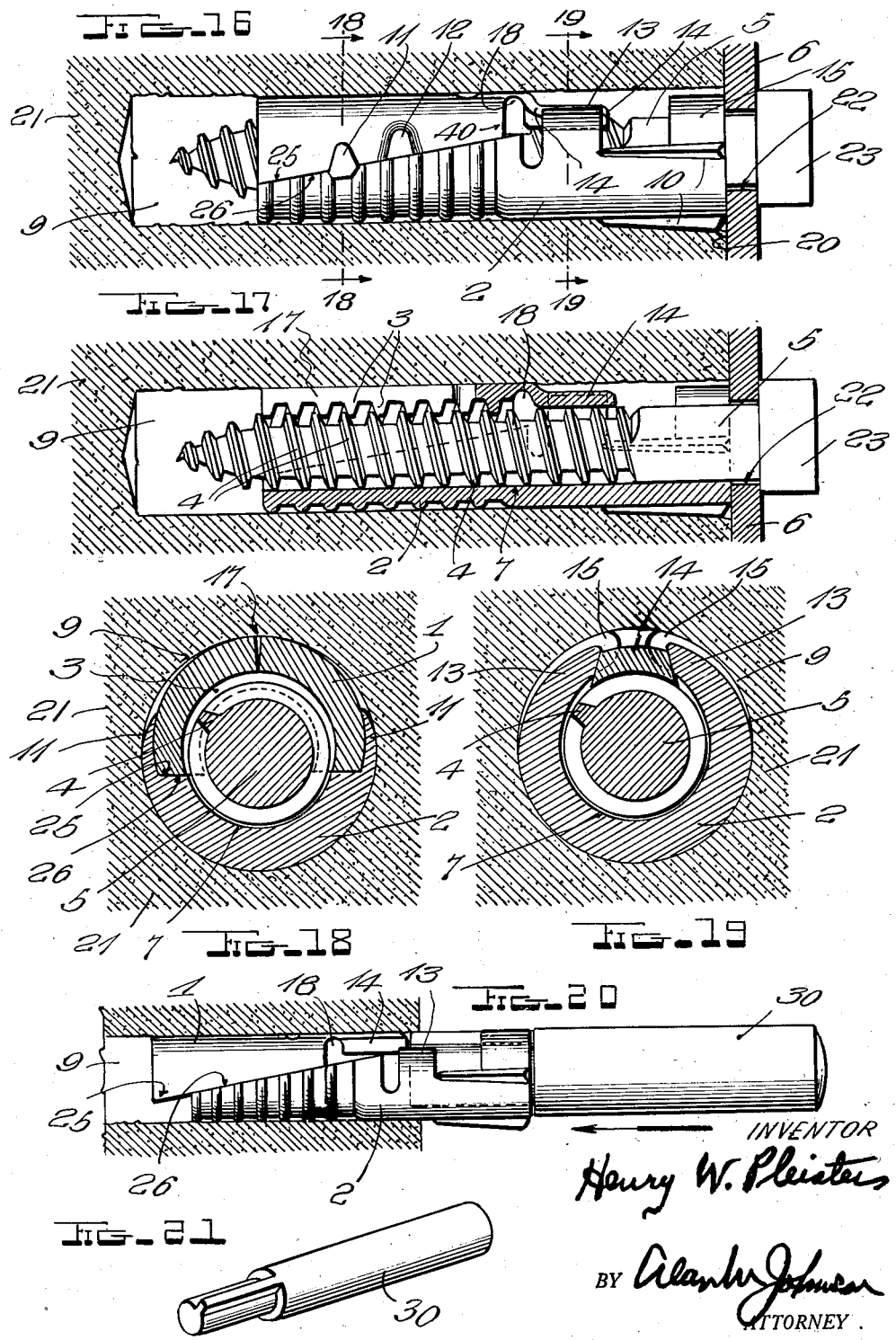

Patented Mar. 12, 1935

1,993,749

UNITED STATES PATENT OFFICE 1,993,749

BOLT ANCHOR

Henry W. Pleister, Westfield, N. J., assignor to Henry B. Newhall Corporation, Garwood, N. J., a corporation of New Jersey Application March 3, 1934, Serial No. 713,918

10 Claims. (Cl. 85—2.4)

My invention relates to bolt anchors and more particularly to bolt anchor shields, formed of a plurality of shield members, having cooperating inclined surfaces adapted to slide longitudinally upon each other in situ, to obtain, for a given size bolt anchor shield, the maximum grip or bond with the walls of a hole in which it is mounted.

My invention comprises such a bolt anchor which can be successfully operated without regard to the exact length of a screw, or other expanding member, to be used with a particular length of shield members; and without regard to the thickness of that part of the work to be secured.

My invention further comprises such a bolt anchor in which the plurality of shield members are immovably held together in their inoperative position, for transportation, handling and locating in the hole where they are to be expanded.

My invention further comprises such a bolt anchor in which one of the shield members carries, or is provided with a locking member, to lock the shield to the screw or other expanding member, so that jarring and vibration of the work supported, will not cause the screw to work out of the shield members, thereby preventing rattling or teetering of the work, and possible danger to persons by the work falling. This locking member is also preferably, though not necessarily, a guiding member to insure the proper alignment of the moving parts of the shield.

My invention further covers such a shield formed of a plurality of parts, in which one of the parts is provided with means to anchor, or resist movement in a hole, while its cooperating shield member is provided with a smooth exterior surface, to permit its movement in situ.

My invention further is an improvement on the type of expansion bolt illustrated and described in the expired patent to Law 987,381 patented March 21, 1911.

My invention further covers certain articles of manufacture, combinations, and sub-combinations, and details of construction, all of which will be more fully hereinafter described and pointed out in the claims.

In the drawings, the same reference numerals refer to similar parts in the several figures;—

Fig. 1 is a side elevation of my bolt anchor shield formed of two shield members 1 and 2 shown in juxtaposition.

Fig. 2 is a plan view of the shield member 1.

Fig. 3 is a bottom view of the shield member 1.

Fig. 4 is a vertical section on line 4—4 of Fig. 2.

Fig. 5 is a top plan view of the shield section 2, reversed from the position shown at Fig. 1.

Fig. 6 is a bottom plan view of the shield section 2, shown at Fig. 5.

Fig. 7 is a vertical section on line 7—7 of Fig. 6.

Fig. 8 is a side elevation of my preferred form of shield, shown partly broken away to more clearly illustrate that the tongue 14 of the shield member 1 is guided by the guide lugs 13—13.

Fig. 9 is a bottom plan view of the shield shown in Fig. 8.

Fig. 10 is a top plan view of the shield shown in Fig. 8.

Fig. 11 is a side elevation of my bolt anchor inserted in a hole, usually in brick, concrete, masonry, terra cotta or other similar material, ready to be expanded. Figures 11 to 15 inclusive show the shield expanded in a well drilled hole.

Fig. 12 is a side elevation, similar to Fig. 11, showing the bolt anchor expanded.

Fig. 13 is a vertical section.

Fig. 14 is a cross section on line 14—14 of Fig. 13.

Fig. 15 is a cross section on line 15—15 of Fig. 13.

Figures 16 to 19 inclusive illustrate the shield members expanded in a poorly drilled hole, considerably larger than necessary for the particular size shield members used. Figure 16 is a side elevation, the support and work being shown in section.

Figure 17 is a longitudinal section of Fig. 16.

Fig. 18 is a cross section on line 18—18 of Fig. 16.

Fig. 19 is a cross section on line 19—19 of Fig. 16.

Fig. 20 is a side elevation of my shield being placed in position by a setting tool, which, may or may not, be used.

Fig. 21 is a perspective view of the setting tool used in Fig. 20. When holding lugs 11—11 or equivalent means, are not employed to hold the shield members in their inoperative position, I preferably employ the setting tool.

The prior art, in accordance with section 4888 of the revised statutes will be referred to, to more clearly point out and particularly claim applicant's invention.

The general type of my expansion bolt anchor is illustrated and described in the expired domestic patent to Law 987,381 patented March 21, 1911, previously referred to.

My invention may be considered an improvement on this patent.

In this patent, what is called the shell a is provided with an "integral toe *b* to engage the lower end of the bolt and thus prevent the shell when the bolt is operated from moving towards the head of the bolt."

This construction requires a lag or other screw to be of just the right length to contact with the toe *b* at the same time the screw reaches a proper friction or tension against the work (not lettered in his drawing) to be supported.

This is almost an impossible feat for if the lag or other screw, should contact with the toe *b* just prior to its having reached a full tension contact with the work to be supported, no amount of turning the the screw will ever bring the head of the screw up any closer to the work, which will cause the work to teeter, rattle, and give a very unworkmanlike and slovenly appearance of the job.

To remove that screw, and try out different lengths of lag screws, or other screws, requires many sizes of screws to be taken to the job, besides the great loss of time necessary to try out one length of screw after the other, with no positive assurance that any one of them will be the exact length required for that particular job, with that particular thickness of work to be supported.

Necessarily, additional capital has to be tied up by the contractor, mechanic or hardware dealer, in stocking many different lengths of screws, no one of which may be satisfactory for the particular job, for the reasons given.

As will be more fully hereinafter pointed out, in applicant's invention all this is avoided because various lengths of lag screws, or other screws, may be used with equal effect, all insuring a perfect job.

In this prior patent the backing of the screw against the toe *b* is relied upon to hold or anchor the shield member *a*.

In my invention the ends of the shield members are both open, so that different lengths of screws may be used.

One of the shield members is provided with means to anchor it by engaging its corrugations with the voids and irregularities in the surface of a hole, while the exterior of the other, the movable shield member, is formed smooth to permit that member to be drawn forward when the head of the lag, or other screw, is brought up against the work to be supported. There are other improvements over this prior art which will be described and claimed hereinafter.

In my invention the bolt anchor shield is formed of a plurality of shield members 1 and 2, Fig. 1. While I preferably use two such members, it is of course to be understood this number may be varied. The member 2 is meant to be fixed or anchored in situ, while the member 1 is adapted to be moved forward by its female threads 3 cooperating with the male threads 4 of the expanding member 5, which is usually a lag screw. While I will, for convenience, hereinafter refer to this member 5 as a lag screw, it is to be understood that any form of expanding member which will cause the movable member to move forward towards the work 6 to be supported, will come under my invention.

The anchoring shield member 2 has a smooth non-threaded non-tapering bore 7, its exterior being provided with transverse ribs or corrugations 8—8 to cooperate with the voids and irregularities of the hole 9. At one end I preferably, though not necessarily, provide this shield member 2 with inclined longitudinally extending ribs 10—10 to assist in seating it in the hole 9.

This shield member 2 is also provided with bendable fastening lugs 11, to cooperate with shallow grooves 12, 12 in the movable shield section 1. The edges of these grooves 12, 12 form inclined surfaces permitting the lugs 11, 11 to be forced out when the shield section 1 is drawn forward by the screw, as will be hereinafter described, see Figs. 12 and 16.

The section 2 is also provided with guide lugs 13, 13 to cooperate with the tongue 14 of the shield member 1. This shield member 2 is also provided with head lugs 15, 15 which extends towards each other, Fig. 6, and form a head for that shield member.

The movable shield member 1 is provided with a slot 17 for a purpose more fully hereinafter described. The tongue 14 serves not only as a guide for the longitudinal movement of the movable shield member, but it may also, in some cases, act as a lock to engage with the expanding screw 5, and lock it to the shield. A weakening groove 18 is employed, if necessary, to more readily permit the bending of the tongue 14, to permit it to engage with and lock the screw to the shield.

In practise the two shield members 1 and 2 are secured together by the sides of the tongue 14 being engaged under the ends of the guide lugs 13, 13 and the bendable lugs 11, 11 being peened or forced down into the shallow grooves 12, 12 in the shield member 1.

The shield members will then be in the position illustrated in Figures 8, 9 and 10, ready for handling, shipping and transportation.

Bolt anchors are usually employed in holes drilled in masonry, brick, concrete, terra cotta or similar material. These drilled holes vary greatly with the skill of the workman. Some are drilled accurately, others are much too large for the particular size shield to be employed, while others will vary between these extremes depending upon the craftsmanship of the mechanic.

I have shown in Figures 11 to 15 my expansion bolt expanded in a well drilled hole 9 of the correct diameter for the particular size bolt anchor shield to be employed therein.

The shield members 1 and 2, preferably secured together as illustrated in Figures 8, 9 and 10, are inserted in the hole 9. The work 6 is then brought up to the surface 20 of the wall or other suitable support 21. The screw 5 is then inserted through a hole 22 in the work and then threaded into the shield members. There being no threads on the interior of the fixed shield member 2 the male threads of the screw pass idly down the bore 7 of this member. They soon engage with the female threads 3 of the movable shield member 1, but as the axial bore is not tapered, there is no expansion of the shield members 1 and 2 until the head 23 of the bolt contacts with the work. Should the lag or other screw be longer than the shield members 1 and 2 its end passes freely through the open or free ends of the shield members, Figures 11, 12 and 13, so that lag or other screws, of various lengths, within a wide range, may be employed to expand any particular length of shield members 1 and 2.

As soon as the head 23 of a screw contacts with the work 6, of any description, to be supported, the female screw threads 3 begin to exert pressure upon the locking lugs 11, 11. Further rotation of the head 23 in contact with the work 6 will cause the shallow grooves 12, 12 to slip under these lugs 11, 11 and cause the inclined wedge surfaces 25, 25 to move up the cooperating wedge surfaces 26, 26 on the shield member 2. This longitudinal movement is guided by the sides of the tongue 14 moving in contact with the guide lugs 13, 13.

In a well drilled hole only a few turns of the lag or other screw is necessary to obtain the required expansion of the shield members 1 and 2 and the necessary friction or grip between the work 6 and the surface 20 of the wall and the head 23 of the screw.

By continuing the rotation of the screw slightly, the weakening groove 18 in the tongue 14 will cause the tongue 14 to bend downward towards the axis of the lag or other screw 5 and bear upon it so strongly as to lock the screw 5 against unscrewing, due to vibration of the work 6, or from other causes.

I have shown my bolt anchor mounted and expanded in a poorly drilled hole in Figures 16 to 19, inclusive.

The action is the same as previously described, except with the hole too large, due to poor drilling and poor workmanship, the movable shield member 1 is caused to move its inclined or wedged surfaces 25, 25 so far up the cooperating wedge or inclined surfaces 26, 26 of the other shield member, that the upper portion of the female threads 3 will not properly contact with the male threads 4 of the screw 5 to get the required maximum bond or grip between the bolt and the shield member. In other words in such an enlarged hole, a part of the female threads would not cooperate with the male threads on the bolt.

I overcome this difficulty by placing the slot 17, having preferably, though not necessarily, beveled edges, in the shield member 1. In a properly drilled hole the contour of this slot is little changed, see Figure 14, when the parts are expanded.

In a poorly drilled and enlarged hole, Figures 16 and 18, the excessive longitudinal movement of the movable shield member 1 upon the fixed shield member 2, will cause the shield member 1 to move radially to such an extent as to exert a crushing effect upon the shield member 1. This crushing action will cause the slot 17 to entirely, or partially, close, as may be necessary, to force the crown of the shield member 1 down towards the axis of the screw. This will cause that portion of the female thread 3 which has become disengaged, or partially disengaged from the male threads 4 of the lag or other screw, to be again forced into engagement with said male threads. See Figure 18 where the slot 17 is substantially closed.

While my expansion bolt will work satisfactorily without the slot 17, I have found from actual tests, in a testing machine, that when expanded in a poorly drilled over-sized hole my expansion bolt will develop about 1000 lbs. less load, because the female threads being partially disengaged from the male threads, will strip at a load about 1000 lbs. below that of one of my identical bolt anchors equipped with a slot 17.

The forward sliding movement of the movable shield section 1 is limited by its shoulders 40, 40 contacting with the sides of the guide lugs 13—13 on the non-movable shield section 2.

In some cases I may omit the locking lugs 11—11 and the cooperating grooves 12—12 or other equivalent locking means, to hold the shield members 1 and 2 in their inoperative position.

In such case I may use a setting tool 30, Fig. 21, to locate my bolt anchor in position, Fig. 20, so that the shield members 1 and 2 will remain in their inoperative position while being inserted in the hole.

With the old direct type lag screw shield, which relies upon the spread of the parts due to the tapered bore, the maximum expansion is fixed and therefore they work satisfactorily only in holes which are very carefully drilled. With my invention variations are taken up from zero to the extreme expansion to suit the variations in the hole diameter by turning the lag screw until it can not be turned any further. Thus, if a hole is undersized a very few turns will accomplish the full holding power and in a larger hole many turns of the screw can be made before the full holding power is accomplished.

Having thus described this invention in connection with illustrative embodiments thereof, to the details of which I do not desire to be limited, what is claimed as new and what is desired to secure by Letters Patent is set forth in the appended claims.

What I claim is:

1. In a bolt anchor the combination of a plurality of shield members having open ends and cooperated inclined surfaces, one of the shield members being provided with means to cooperate with an expanding member, and a locking member carried by one of the shield members, adapted when the shield members are expanded to contact with the expanding member to lock it in position.

2. In a bolt anchor the combination of a plurality of shield members having cooperating inclined surfaces, means to guide one of the shield members when its inclined surfaces move upon the inclined surfaces of the other member to expand the shield, said means also adapted to lock the shield members to an expanding member, and an expanding member adapted to move the shield members upon each other.

3. In a bolt anchor the combination of a plurality of shield members having cooperating inclined surfaces, means to guide one of the shield members when its inclined surfaces move upon the inclined surfaces of the other member to expand the shield, said means also adapted to lock the shield members to an expanding screw, and an expanding screw adapted to move the shield members upon each other.

4. In a bolt anchor the combination of a plurality of shield members having cooperating inclined surfaces, means including a bendable tongue to guide the shield members when the inclined surfaces move upon each other to expand the shield, said bendable tongue also adapted to engage with an expanding screw to lock the screw against accidental unscrewing.

5. In a bolt anchor the combination of a plurality of shield members having cooperating inclined surfaces, one of said members being provided with interior screw threads and with a slot, the other shield member having an unthreaded inner surface, said slot adapted to be closed in the expanded position of the shield members to insure substantially full contact of the interior threads of the shield member with the threads of an expanding screw even when expanded in a poorly drilled and large hole, and an expanding screw.

6. In a bolt anchor the combination of plurality of shield members having cooperating inclined or wedge surfaces, open ends, and each provided with one open side, one of the shield members provide with an interior mutilated female screw thread and the other shield member being unthreaded, to permit the expanding member to maintain its axial alignment in the shield as the shield is expanded.

7. In a bolt anchor the combinaton of a plurality of shield members having cooperating incline or wedge surfaces, open ends, and each provided with one open side, one of the shield members provided with an interior mutilated female screw thread and the other shield member being unthreaded, to permit the expanding member to maintain its axial alignment in the shield as the shield is expanded, and means separate from the expanding means to hold the shield members together for handling and transportation.

8. In a bolt anchor the combination of a plurality of shield members having open ends and cooperating inclined surfaces adapted to move longitudinally upon each other, and non-rotating holding means adapted to hold the shield members in their non-expanding positions for transportation, handling and placing them in a hole in which they are to be expanded, said non-rotating holding means being carried by the longitudinally movable shield members, one portion of said non-rotating holding means adapted to move longitudinally of anothr portion of the non-rotating holding means when the shield is expanded in a hole.

9. In a bolt anchor the combination of a plurality of shield members having open ends and cooperating wedge surfaces adapted to move longitudinally upon each other, and non-rotating holding means adapted to hold the shield members in their non-expanding positions for transportation, handling and placing them in a hole in which they are to be expanded, said non-rotating holding means being carried by the longitudinally moveable shield members, one portion of said non-rotating holding means adapted to move longitudinally of another portion of the non-rotating holding means when the shield is expanded in a hole.

10. In a bolt anchor the combination of a plurality of shield members having open ends and cooperating wedge surfaces adapted to move longitudinally upon each other, and non-rotating holding means adapted to hold one shield member in advance of the other in their non-expanding positions for transportation, handling and placing them in a hole in which they are to be expanded, said non-rotating holding means being carried by the longitudinally moveable shield members, one portion of said non-rotating holding means adapted to move longitudinally of another portion of the non-rotating holding means when the shield is expanded in a hole.

HENRY W. PLEISTER.